US008989026B2

(12) United States Patent
Gaal et al.

(10) Patent No.: US 8,989,026 B2
(45) Date of Patent: Mar. 24, 2015

(54) USER-SPECIFIC SEARCH SPACE DESIGN FOR MULTI-CARRIER OPERATION

(75) Inventors: Peter Gaal, San Diego, CA (US);
Wanshi Chen, San Diego, CA (US);
Jelena M. Damnjanovic, Del Mar, CA (US); Aleksandar Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 695 days.

(21) Appl. No.: 13/039,274

(22) Filed: Mar. 2, 2011

(65) Prior Publication Data

US 2011/0228724 A1    Sep. 22, 2011

Related U.S. Application Data

(60) Provisional application No. 61/315,374, filed on Mar. 18, 2010.

(51) Int. Cl.
| | |
|---|---|
| H04L 12/26 | (2006.01) |
| H04W 4/00 | (2009.01) |
| H04J 1/00 | (2006.01) |

(Continued)

(52) U.S. Cl.
CPC ......... *H04L 5/0042* (2013.01); *H04W 72/0453* (2013.01); *H04W 72/042* (2013.01); *H04L 5/001* (2013.01); *H04L 5/0094* (2013.01)
USPC ......... 370/252; 370/329; 370/343; 455/422.1

(58) Field of Classification Search
None
See application file for complete search history.

(56) References Cited

U.S. PATENT DOCUMENTS

| 7,873,004 B2 * | 1/2011 | Lee et al. ...................... 370/329 |
| 8,570,969 B2 * | 10/2013 | Kim et al. ...................... 370/329 |
| 2008/0159323 A1 * | 7/2008 | Rinne et al. ................... 370/431 |

(Continued)

FOREIGN PATENT DOCUMENTS

| EP | 2194751 A2 | 6/2010 |
| WO | 2010088536 A1 | 8/2010 |
| WO | 2010104957 A2 | 9/2010 |

OTHER PUBLICATIONS

International Search Report and Written Opinion—PCT/US2011/028803, International Search Authority—European Patent Office—Aug. 16, 2011.

(Continued)

*Primary Examiner* — Faruk Hamza
*Assistant Examiner* — Cassandra Decker
(74) *Attorney, Agent, or Firm* — Paul Kuo

(57) ABSTRACT

Certain aspects of the present disclosure relate to techniques for user-specific search space design for multi-carrier operation in Long Term Evolution Advanced (LTE-A) systems. The user-specific search space can be designed for searching Physical Downlink Control Channels (PDCCHs) transmitted on one component carrier (CC) that schedules Physical Downlink Shared Channel/Physical Uplink Shared Channel (PDSCH/PUSCH) transmissions on two or more different CCs. In one aspect, multiple independent user-specific search spaces can be designed. In another aspect, one user-specific search space can be randomly derived and then expanded to accommodate search for multiple CCs. In yet another aspect, the search space design can retain randomness in starting search element indices of multiple PDSCH/PUSCH CCs, while overlapping of search spaces for multiple PDSCH/PUSCH CCs can be avoided.

37 Claims, 11 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2009/0238091 A1* | 9/2009 | Kim et al. | 370/252 |
| 2010/0232373 A1 | 9/2010 | Nory et al. | |
| 2010/0279628 A1* | 11/2010 | Love et al. | 455/70 |
| 2010/0303011 A1* | 12/2010 | Pan et al. | 370/328 |
| 2010/0317360 A1* | 12/2010 | McBeath et al. | 455/450 |
| 2011/0110316 A1 | 5/2011 | Chen et al. | |
| 2011/0201333 A1* | 8/2011 | Kwon et al. | 455/434 |
| 2011/0205978 A1* | 8/2011 | Nory et al. | 370/329 |
| 2012/0063351 A1* | 3/2012 | Kim et al. | 370/252 |

OTHER PUBLICATIONS

LG Electronics: "Randomization Function for PDCCH search space", 3GPP Draft; R1-081567 PDCCH Search Space Randomization (Revised), 3rd Generation Partnership Project (3GPP), Mobile Competence Centre ; 650, Route Des Lucioles ; F-06921 Sophia-Antipolis Cedex ; France, vol. RAN WG1, No. Shenzhen, China; 20080409, Apr. 9, 2008, XP050109982.

LG Electronics: "UE-specific Search Space Offset Details for Cross-Carrier Scheduling", 3GPP Draft; R1-104754_SS_LGE, 3rd Generation Partnership Project (3GPP), Mobile Competence Centre ; 650, Route Des Lucioles ; F-06921 Sophia-Antipolis Cedex ; France, vol. RAN WG1, No. Madrid, Spain; 20100823, Aug. 18, 2010, XP050450133.

Love R., et al., "Downlink Control Channel Design for 3GPP LTE", Wireless Communications and Networking Conference, 2008, WCNC 2008, IEEE, Piscataway, NJ, USA, Mar. 31, 2008, pp. 813-818, XP031243734, ISBN: 978-1-4244-1997-5.

NTT DoCoMo: "DL Layered Control Signal Structure in LTE-Advanced", 3GPP Draft; RI-083681 DL Layered Control Signal, 3rd Generation Partnership Project (3GPP), Mobile Competence Centre ;ba 650, Route Des Lucioles ; F-06921 Sophia-Antipolis Cedex ; France, No. Prague, Czech Republic; 20080924, Sep. 24, 2008, XP050317028.

Panasonic, "Component carrier indication scheme for carrier aggregation", 3GPP Draft, R1-093465, 3rd Generation Partnership Project (3GPP), No. Shenzhen, China, 20090818, Aug. 18, 2009, XP050351735, Franc.

Research in Motion et al: "Details of CC-specific Offset", 3GPP Draft; RI-104916 (RIM-Search Spaces), 3rd Generation Partnership Project (3GPP), Mobile Competence Centre ; 650, Route Des Lucioles ; F-06921 Sophia-Antipolis Cedex ; France, vol. RAN WGI, No. Madrid, Spain; 20100823, Aug. 17, 2010, XP050450062.

Panasonic, PDCCH with cross carrier operation, 3GPP TSG-RAN WG1 Meeting #60 R1-101249, Jan. 22, 2010, URL, http://www.3gpp.org/ftp/tsg_ran/wg1_rl1/TSGR1_60/Docs/R1-101249.zip Qualcomm Incorporated, PDCCH for CA: monitoring set, search space and blind decodes, 3GPP TSG RAN WG1 #60bis R1-102318, Apr. 12, 2010, URL, http://www.3gpp.org/ftp/tsg_ran/wg1_rl1/TSGR1_60b/Docs/R1-102318.zip.

Taiwan Search Report—TW100109196—TIPO—Jan. 14, 2014.

\* cited by examiner

| Type | Search space $S_k^{(L)}$ Aggregation level $L$ | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

US 8,989,026 B2

USER-SPECIFIC SEARCH SPACE DESIGN FOR MULTI-CARRIER OPERATION

CLAIM OF PRIORITY UNDER 35 U.S.C. §119

The present application for patent claims benefit of U.S. Provisional Patent Application Ser. No. 61/315,374, entitled, "UE-specific search space design for multi-carrier operation in LTE-A", filed Mar. 18, 2010, and assigned to the assignee hereof and hereby expressly incorporated by reference herein.

BACKGROUND

1. Field

Certain aspects of the present disclosure generally relate to wireless communications and, more particularly, to a method for designing user-specific search space for multi-carrier operations in Long Term Evolution Advanced (LTE-A) wireless systems.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The 3GPP LTE-A represents a major advance in cellular technology and it is a next step forward in cellular $3^{rd}$ generation (3G) services as a natural evolution of Global System for Mobile Communications (GSM) and Universal Mobile Telecommunications System (UMTS). The LTE-A provides for an uplink speed of up to 75 megabits per second (Mbps) and a downlink speed of up to 300 Mbps, and brings many technical benefits to cellular networks. The LTE-A is designed to meet carrier needs for high-speed data and media transport as well as high-capacity voice support. The bandwidth may be scalable from 1.4 MHz to 20 MHz. This suits the requirements of different network operators that have different bandwidth allocations, and also allows operators to provide different services based on spectrum. The LTE-A is also expected to improve spectral efficiency in 3G networks, allowing carriers to provide more data and voice services over a given bandwidth.

Physical layer (PHY) of the LTE-A standard is a highly efficient means of conveying both data and control information between an enhanced base station (eNodeB) and mobile user equipment (UE). The LTE-A PHY employs advanced technologies that are new to cellular applications. These include Orthogonal Frequency Division Multiplexing (OFDM) and Multiple Input Multiple Output (MIMO) data transmission. In addition, the LTE-A PHY uses OFDMA on the downlink and Single Carrier-Frequency Division Multiple Access (SC-FDMA) on the uplink. OFDMA allows data to be directed to or from multiple users on a subcarrier-by-subcarrier basis for a specified number of symbol periods.

In the LTE-A system, a user equipment (UE) may be configured with one or more component carriers (CCs). The cross-carrier signaling may be enabled, such that the scheduling of Physical Downlink Shared Channel (PDSCH) or Physical Uplink Shared Channel (PUSCH) transmissions on one CC may come from Physical Downlink Control Channel (PDCCH) on a different CC. As a result, one CC may comprise multiple PDCCHs scheduling PDSCH/PUSCH transmissions on two or more CCs.

SUMMARY

Certain aspects of the present disclosure provide a method for wireless communications. The method generally includes receiving a subframe with an indication about a plurality of component carriers (CCs) configured for data communications, wherein each of the CCs is indicated in a control channel element (CCE) of a different plurality of Physical Downlink Control Channel (PDCCH) candidates within the subframe, searching, within a first plurality of PDCCH candidates of the subframe, for an indication about a first CC from the plurality of CCs, wherein the search starts from a CCE with an index that is randomly derived, and searching, within a second plurality of PDCCH candidates of the subframe, for another indication about a second CC from the plurality of CCs, wherein the search for the other indication starts from another CCE with another index derived based on the index and an offset.

Certain aspects of the present disclosure provide an apparatus for wireless communications. The apparatus generally includes a receiver configured to receive a subframe with an indication about a plurality of component carriers (CCs) configured for data communications, wherein each of the CCs is indicated in a control channel element (CCE) of a different plurality of Physical Downlink Control Channel (PDCCH) candidates within the subframe, a first circuit configured to search, within a first plurality of PDCCH candidates of the subframe, for an indication about a first CC from the plurality of CCs, wherein the search starts from a CCE with an index that is randomly derived, and a second circuit configured to search, within a second plurality of PDCCH candidates of the subframe, for another indication about a second CC from the plurality of CCs, wherein the search for the other indication starts from another CCE with another index derived based on the index and an offset.

Certain aspects of the present disclosure provide an apparatus for wireless communications. The apparatus generally includes means for receiving a subframe with an indication about a plurality of component carriers (CCs) configured for data communications, wherein each of the CCs is indicated in a control channel element (CCE) of a different plurality of Physical Downlink Control Channel (PDCCH) candidates within the subframe, means for searching, within a first plurality of PDCCH candidates of the subframe, for an indication about a first CC from the plurality of CCs, wherein the search starts from a CCE with an index that is randomly derived, and means for searching, within a second plurality of PDCCH candidates of the subframe, for another indication about a second CC from the plurality of CCs, wherein the search for the other indication starts from another CCE with another index derived based on the index and an offset.

Certain aspects of the present disclosure provide a computer-program product for wireless communications. The computer-program product includes a computer-readable medium comprising instructions executable to receive a subframe with an indication about a plurality of component carriers (CCs) configured for data communications, wherein each of the CCs is indicated in a control channel element (CCE) of a different plurality of Physical Downlink Control Channel (PDCCH) candidates within the subframe, search, within a first plurality of PDCCH candidates of the subframe, for an indication about a first CC from the plurality of CCs, wherein the search starts from a CCE with an index that is randomly derived, and search, within a second plurality of PDCCH candidates of the subframe, for another indication about a second CC from the plurality of CCs, wherein the search for the other indication starts from another CCE with another index derived based on the index and an offset.

Certain aspects of the present disclosure provide a wireless node. The wireless node generally includes at least one antenna, a receiver configured to receive via the at least one antenna a subframe with an indication about a plurality of component carriers (CCs) configured for data communications, wherein each of the CCs is indicated in a control channel element (CCE) of a different plurality of Physical Downlink Control Channel (PDCCH) candidates within the subframe, a first circuit configured to search, within a first plurality of PDCCH candidates of the subframe, for an indication about a first CC from the plurality of CCs, wherein the search starts from a CCE with an index that is randomly derived, and a second circuit configured to search, within a second plurality of PDCCH candidates of the subframe, for another indication about a second CC from the plurality of CCs, wherein the search for the other indication starts from another CCE with another index derived based on the index and an offset.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
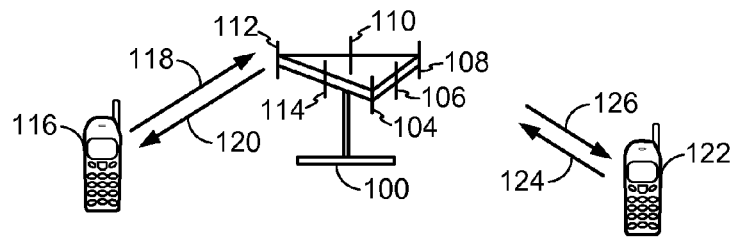
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution Advanced (LTE-A) is an upcoming release of UMTS that uses E-UTRA. UTRA, E-UTRA, GSM, UMTS and LTE-A are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE-A, and LTE-A terminology is used in much of the description below.

Certain aspects of the present disclosure are related to single carrier frequency division multiple access (SC-FDMA) transmission technique, which utilizes single carrier modulation at a transmitter and frequency domain equalization at a receiver. The SC-FDMA has similar performance and essentially the same overall complexity as the OFDMA. Main advantage of the SC-FDMA is that the SC-FDMA signal provides a lower peak-to-average power ratio (PAPR) than the OFDMA signal because of its inherent single carrier structure. The SC-FDMA technique has drawn great attention, especially in the uplink communications where lower PAPR greatly benefits a mobile terminal in terms of transmit power efficiency. This technique is currently utilized as the uplink multiple access scheme in 3GPP LTE, 3GPP LTE-A, or Evolved UTRA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

In an aspect of the present disclosure, the AP 100 may transmit multiple Physical Downlink Control Channels (PDCCHs) to at least one of the access terminals 116, 122 using a component carrier (CC). The PDCCHs may be utilized to schedule Physical Downlink Shared Channel (PDSCH)/Physical Uplink Shared Channel (PUSCH) transmissions on two or more different CCs. The access terminals 116, 122 may receive the PDCCHs, and may perform searching of the PDCCHs for an indication about the two or more CCs on which the PDSCH/PUSCH transmissions are scheduled. The searching may be performed in accordance with one of proposed algorithms of the present disclosure.

Figure 2:
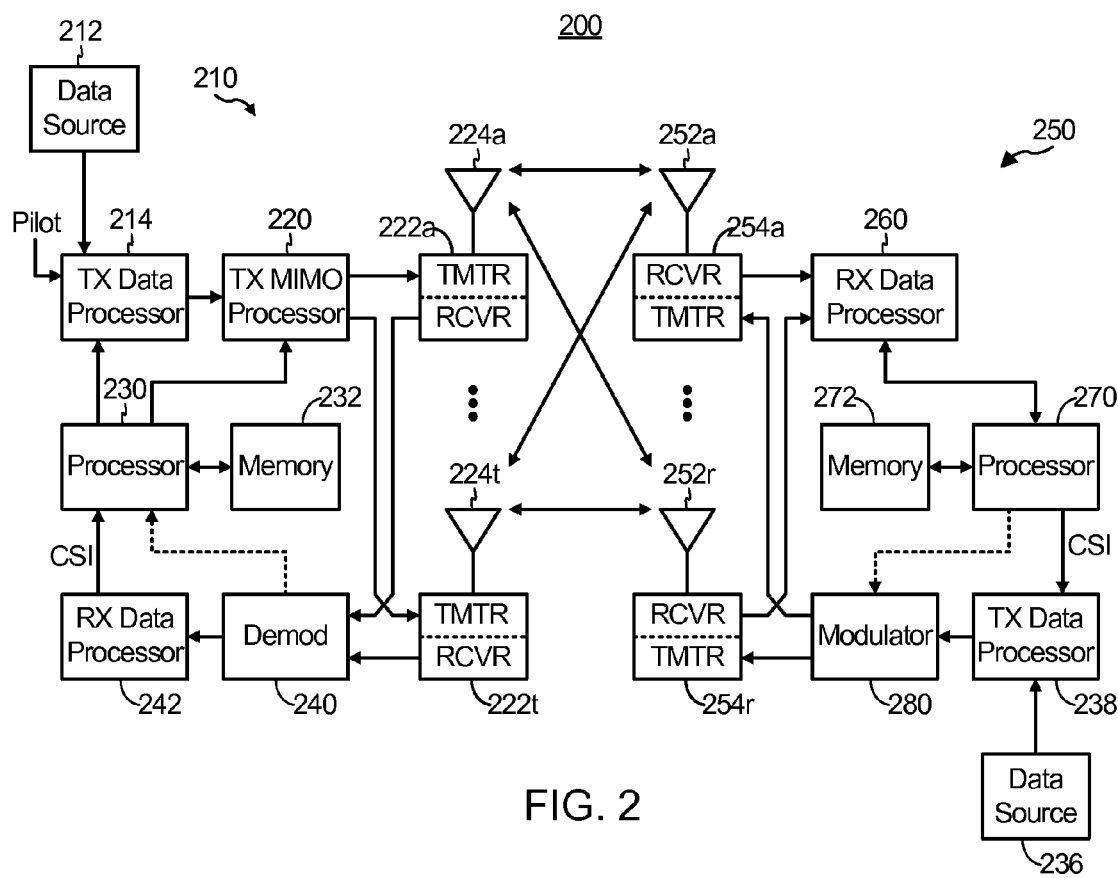
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In an aspect of the present disclosure, the access point 210 may transmit multiple PDCCHs to the access terminal 250 using a certain component carrier (CC). The PDCCHs may be utilized to schedule PDSCH/PUSCH transmissions on two or more different CCs. The access terminal 250 may receive the PDCCHs, and then the processor 270 may perform searching of the PDCCHs for an indication about the two or more CCs on which the PDSCH/PUSCH transmissions are scheduled. The searching may be performed in accordance with one of proposed algorithms of the present disclosure.

Figure 3:
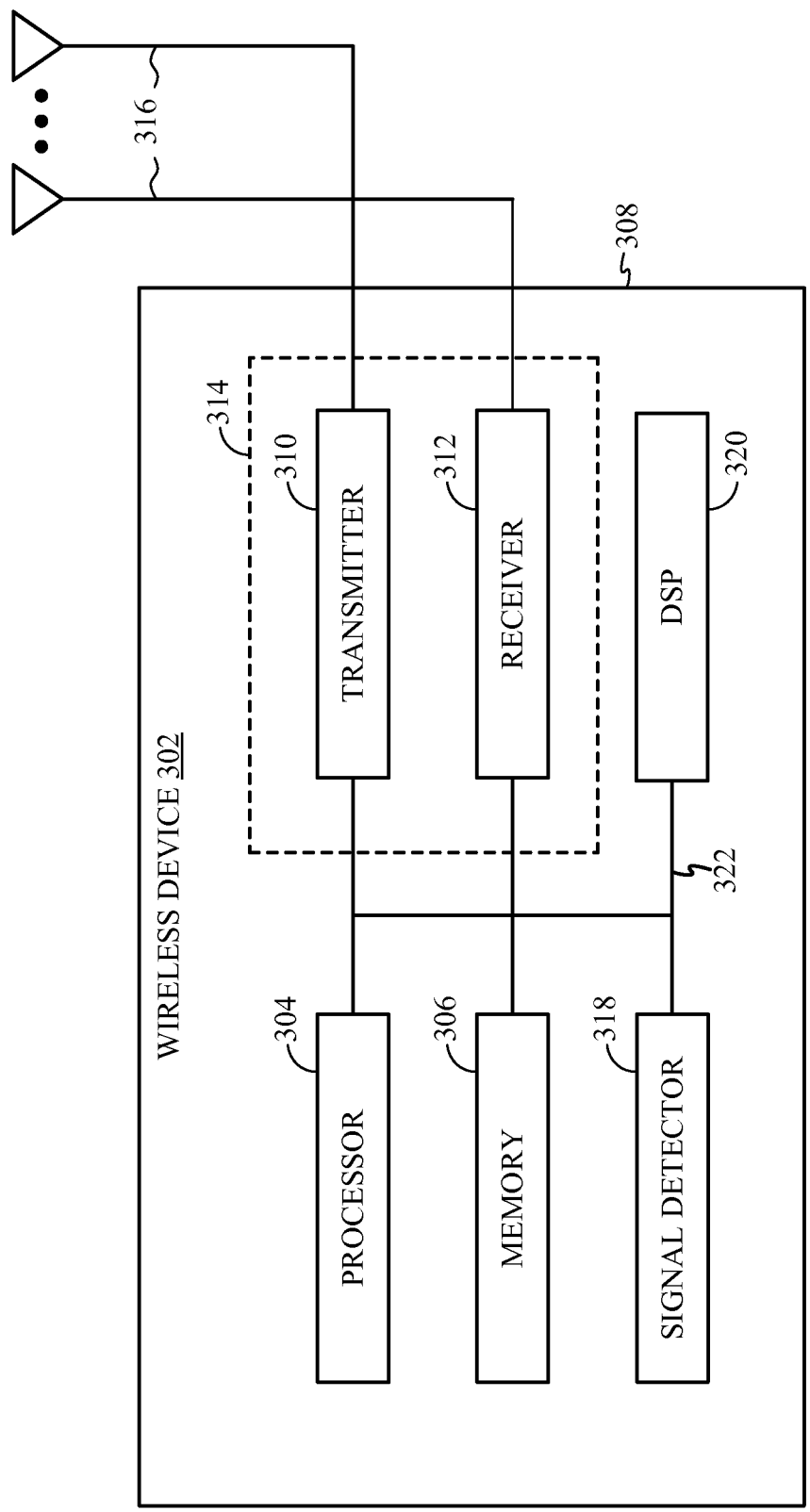
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In an aspect of the present disclosure, the wireless device 302 may receive multiple PDCCHs transmitted from a serving base station (not shown) using a component carrier (CC). The PDCCHs may be utilized to schedule PDSCH/PUSCH transmissions on two or more different CCs. The processor 304 of the wireless device 302 may perform searching of the received PDCCHs for an indication about the two or more CCs on which the PDSCH/PUSCH transmissions are scheduled. The searching may be performed in accordance with one of proposed methods of the present disclosure.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over an entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Certain aspects of the present disclosure support designing user-specific search space(s) for searching Physical Downlink Control Channels (PDCCHs) transmitted on one component carrier (CC) that schedules Physical Downlink Shared Channel/Physical Uplink Shared Channel (PDSCH/PUSCH) transmissions on two or more CCs.

Design of PDCCH Search Space for Component Carriers in Long Term Evolution Systems In Long Term Evolution (LTE) Release-8, each user equipment (UE) may monitor both a common search space and a UE-specific search space in a control region. A search space may comprise a set of CCE locations where a UE may find its PDCCHs. All UEs are aware of the common search space, while the dedicated search space is configured for an individual UE. The maximum number of PDCCH candidates that an UE may attempt to decode in a subframe is listed in FIG. 4. It can be observed that there may be up to six PDCCH candidates in the common search space (i.e., four for control channel element (CCE) aggregation level 4, and two for aggregation level 8), and up to 16 candidates in the UE-specific search space (i.e., six for aggregation level 1, six for aggregation level 2, two for aggregation level 4, and two for aggregation level 8). The PDCCH candidates are transmitted using a number of CCEs. It can be observed from FIG. 4 that the number of CCEs to be searched within each PDCCH candidate of a plurality of PDCCH candidates may depend on the aggregation level. For example, sixteen CCEs are transmitted for both aggregation levels 4 and 8 in the common search space. To find its PDCCH, the UE monitors a set of PDCCH candidates in every subframe. Nine sets of four physical resource elements known as resource element groups (REGs) make up each CCE. Also, the aggregation level is the number of CCEs occupied by a given control message sent on the PDDCH. In one example, the aggregation level can be 1, 2, 4 or 8. The aggregation level is chosen by the eNB with taking into consideration the control message size (larger message→higher aggregation level) and the estimated quality of the DL channel between the eNB and the UE (lower channel quality→higher aggregation level).

Each UE may be configured via Radio Resource Control (RRC) to operate with one of several possible transmission modes. Under each transmission mode, each UE may be required to monitor up to two different PDCCH sizes. As a result, the number of hypotheses detections may be equal to (6+16)*2=44.

It should be noted that each UE may be assigned up to two Radio Network Temporary Identifiers (RNTIs) (e.g., the Cell Radio Network Temporary Identifier (C-RNTI) and semi-persistent scheduling (SPS) (C-RNTI). Determination of UE-specific search space may be based on only one RNTI (e.g., the C-RNTI), and the search space may vary from subframe to subframe. More specifically, CCEs corresponding to PDCCH candidate m of the UE-specific search space with aggregation level L may be given by:

$$L \cdot \{(Y_k+m) \bmod \lfloor N_{CCE,k}/L \rfloor\}+i, \quad (1)$$

where $Y_k$ is defined below, i=0, ..., L−1, and m=0, ..., $M^{(L)}$−1. The parameter $M^{(L)}$ represents the number of PDCCH candidates to monitor in the given search space defined in FIG. 4, and the variable $Y_k$ may be defined by:

$$Y_k=(A \cdot Y_{k-1}) \bmod D, \quad (2)$$

where $Y_{-1}=n_{RNTI}\neq 0$, A=39827, D=65537, k=$\lfloor n_S/2 \rfloor$, $n_S$ is the slot number within a radio frame taking value s from 0, 1, ..., 19, and $n_{RNTI}$ corresponds to a unique RNTI value.

In accordance with certain aspects, the UE-specific search space may have the following properties. In one aspect of the present disclosure, the search spaces for different UEs may or may not overlap. In another aspect, the search space for a given UE may change over subframes, and may be repeated, for example, every 10 subframes or 10 ms. In yet another aspect, the search space for different aggregation levels may follow a tree-structure, i.e., the CCEs for aggregation level L may always start with integer multiples of L.

Cross-Carrier Signaling

In Long Term Evolution Advanced (LTE-A) systems, UE may be configured with multiple carriers (component carriers or CCs). For example, the transmission of PDSCH on one carrier may be signaled by PDCCH on a different carrier, which can be referred to as cross-carrier signaling.

In an aspect, the cross-carrier signaling may be realized via an explicit cross-carrier indicator field (CIF) within the PDCCH. The presence of CIF may be semi-statically enabled. Configuration for the presence of CIF may be UE-specific (i.e., not system-specific or cell-specific). The CIF (if configured) may be, for example, a fixed 3-bit field. The CIF location (if configured) may be fixed irrespective of Downlink Control Information (DCI) format size. Cross-carrier assignments may be configured both when the DCI formats have the same and different sizes. The DCI is a message carried by a PDCCH. It includes control information such as resource assignments for a UE or a group of UEs.

In an aspect, an upper limit may be established on a total number of blind decodes. Cross carrier scheduling for DCI format 0, 1, 1A, 1B, 1D, 2, 2A, 2B in UE-specific search space may be supported by an explicit CIF. The CIF may not be included in DCI format when cyclic redundancy check (CRC) sum is scrambled by System Information Radio Network Temporary Identifier (SI-RNTI). The CIF may not be included in DCI formats 0, 1A in a common search space when the CRC sum is scrambled by C-RNTI/SPS C-RNTI.

Design of PDCCH Search Spaces for Component Carriers

The present disclosure proposes designing the UE-specific search space(s) (UESS) for searching PDCCHs transmitted on one CC that schedules PDSCH/PUSCH transmissions on two or more CCs. In one aspect, multiple independent search spaces may be designed. In this case, the PDCCH search space for each PDSCH/PUSCH CC may be independently derived, each following the same mechanism as in the LTE Release-8, with the possible usage of CIF value. In essence, a starting CCE index for each aggregation level for each PDSCH/PUSCH CC may be derived based on equation (1) or based on a variation of it (e.g., by adding the value of CIF).

Figures 4, 5:
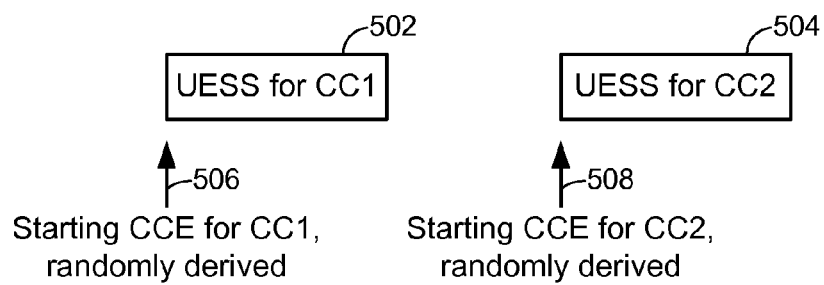
FIG. 4 illustrates an example of number of Physical Downlink Control Channel (PDCCH) candidates that may be monitored by a user terminal in accordance with certain aspects of the present disclosure.
FIG. 5 illustrates an example of multiple search spaces for component carriers (CCs) with starting control channel element (CCE) indices independently derived in accordance with certain aspects of the present disclosure.

The aforementioned approach is illustrated in FIG. 5. UE-specific search spaces 502, 504 for two CCs may be designed, wherein starting CCE indices 506, 508 for both search spaces may be independently derived. In an aspect, the starting CCE indices 506, 508 may be derived randomly.

One disadvantage of the approach illustrated in FIG. 5 can be that the starting CCE indices 506, 508 may be derived multiple times. Furthermore, the starting CCE indices for multiple PDSCH/PUSCH CCs may overlap, as all of them may be randomly derived.

Figure 6:
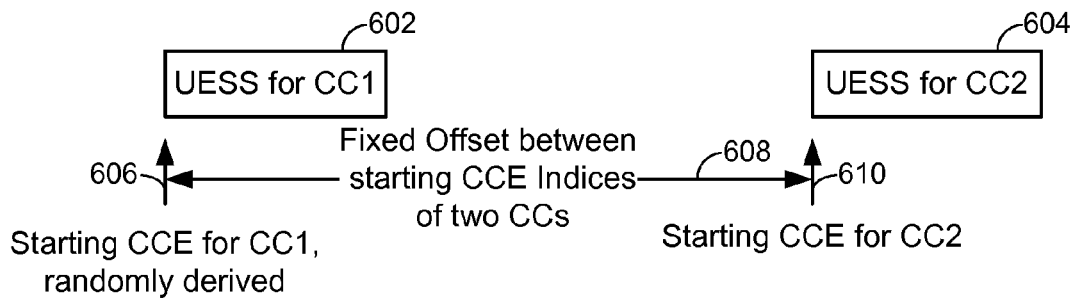
FIG. 6 illustrates an example of randomly derived and expanded search space for multiple CCs in accordance with certain aspects of the present disclosure.

In another aspect of the present disclosure, one search space may be randomly derived and then expanded to accommodate search for multiple CCs. FIG. 6 illustrates an example of randomly derived UE-specific search space 602 for searching of one CC, and an expanded search space 604 for searching of another CC in accordance with certain aspects of the present disclosure. A starting CCE index for each aggregation level may be (randomly) derived once, such as a starting CCE index 606 illustrated in FIG. 6. This index may be then utilized as the reference for deriving all PDSCH/PUSCH CCs via some fixed offset, such as an offset 608 utilized in FIG. 6 for deriving a starting CCE index 610 for the search space 604. The offset 608 (i.e., a difference between the starting index 610 and the starting index 606) may be dependent on an aggregation level, system bandwidth, etc.

A special case of the search space design approach illustrated in FIG. 6 is the case when the offset is chosen such that the search spaces for multiple PDSCH/PUSCH CCs are contiguous. This exemplary case is illustrated in FIG. 7 with contiguous UE-specific search spaces 702 and 704.

Figure 7:
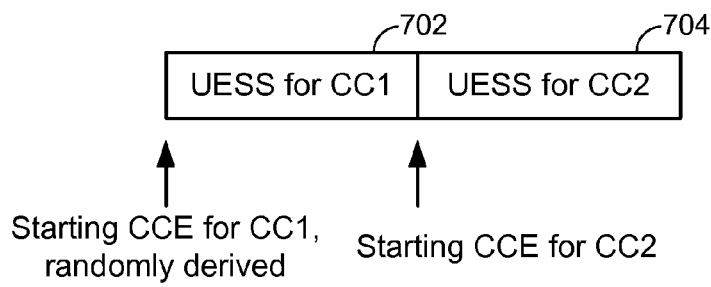
FIG. 7 illustrates another example of randomly derived and expanded search space for multiple CCs in accordance with certain aspects of the present disclosure.

One disadvantage of the approach illustrated in FIGS. 6-7 can be the fact that starting CCE indices of multiple PDSCH/PUSCH CCs utilize one reference point, which may have certain impact on PDCCH blocking probability. Furthermore, search spaces for two or more PDSCH/PUSCH CCs may be overlapped with a higher probability for the search space design approach illustrated in FIGS. 6-7 than for the scheme from FIG. 5.

Certain aspects of the present disclosure support improved design of search spaces for multiple PDSCH/PUSCH CCs. The proposed search space design may retain some randomness in starting CCE indices of multiple PDSCH/PUSCH CCs. Furthermore, for a particular UE, the proposed design may avoid overlapping of search spaces for multiple PDSCH/PUSCH CCs.

It is proposed in the present disclosure to derive the starting CCE index for one PDSCH/PUSCH CC for each aggregation level as in the LTE Release-8. Relative to this CC, random offsets may be defined for each additional PDSCH/PUSCH CC. The randomness may be similarly designed as in the LTE Release 8, but as a function of user identification (ID), cell ID and/or CIF value. The offset may comprise a lower bound, an upper bound, or both bounds. The lower bound may be negative, if overlapping of search spaces is allowed. In an aspect, the upper bound may be equal to 8 CCEs. The bounds may be specified (i.e., hard-coded) in the specifications, or may be configured on a per UE basis.

Figure 8:
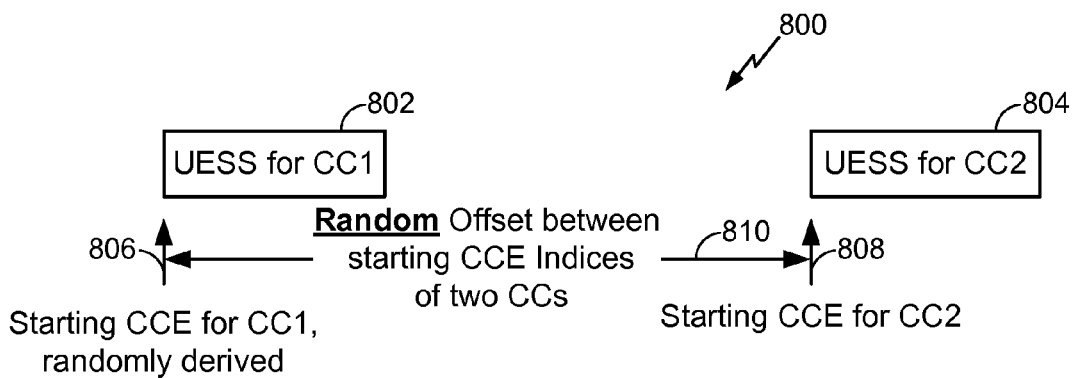
FIG. 8 illustrates an example of user-specific search spaces for multiple CCs in accordance with certain aspects of the present disclosure.

FIG. 8 illustrates an example 800 of user-specific search spaces 802, 804 for searching of two different CCs in accordance with certain aspects of the present disclosure. A starting CCE index 806 for a first CC may be randomly derived, while a starting CCE index 808 for a second CC may be derived based on the random index 806 and a random offset 810, as illustrated in FIG. 8.

Certain aspects of the present disclosure support methods for search space generation that may be applied to a multi-carrier case. In an aspect, if $N_{CC,k}$ is the number of CCs configured in a subframe k, and n=0, 1, ..., $N_{CC,k}-1$ is the CC index within the configured CCs, then the PDCCH decoding candidate $S_{k,m,n}^{(L)}$ for aggregation level L∈{1, 2, 4, 8}, subframe k, carrier index n and candidate index m may be given as:

$$S_{k,m,n}^{(L)} = L \cdot \{(Y_k + m) \bmod \lfloor N_{CCE,k}/L \rfloor\} + i, \quad (3)$$

for $n = 0$ $$S_{k,m,n}^{(L)} =$$

$$L \cdot \{(S_{k,m,n-1}^{(L)}/L + M_{n-1}^{(L)} + P_{k,n} \bmod Q_k^{(L)} + m) \bmod \lfloor N_{CCE,k}/L \rfloor\} + i,$$

for $n = 1, \ldots, N_{CC,k} - 1$, where $N_{CCE,k}$ is the total number of CCEs in the control region of subframe k, L∈{1, 2, 4, 8} is the aggregation level, i=0, ..., L−1 is the CCE index within a given PDCCH decoding candidate, m=0, 1, ..., $M_n^{(L)}-1$ is the PDCCH decoding candidate index, and $M_n^{(L)}$ is the number of PDCCH candidates to be monitored by the UE in the $n^{th}$ CC's search space.

The parameter $Q_k^{(L)}$ from equation (3) may be a fixed number (e.g., $Q_k^{(L)}=3$), or $Q_k^{(L)}$ may be derived according to a specified algorithm, such as:

$$Q_k^{(L)} = \left\lfloor \frac{\left\lfloor \frac{N_{CCE,k}}{L} \right\rfloor - \sum_{n=0}^{N_{CC,k}-1} M_n^{(L)}}{N_{CC,k}-1} \right\rfloor \quad \text{for } N_{CC,k} > 1, \quad (4)$$

$$Q_k^{(L)} = 1 \quad \text{for } N_{CC,k} = 1.$$

As given by equation (4), the parameter $Q_k^L$ may be chosen by considering the aggregation level, the number of decoding candidates per CC, and the total number of available CCEs in the subframe, such that the entire CCE search space may be utilized by multiple CCs. In an aspect, the denominator in equation (4) may be replaced by $N_{CC,k}$.

The parameter $P_{k,n}$ from equation (3) may represent a suitable pseudorandom parameter, which may depend on the subframe index k within a radio frame, on the CC index n, and on the UE-specific identifier $n_{RNTI}$. For example, the $P_{k,n}$ may be defined as:

$$P_{k,n}=f(Y_{k+n}), \quad (5)$$

where f(.) may be any suitable function such as the identity function, and $Y_k$ may be given in a recursive manner as:

$$Y_k=(A \cdot Y_{k-1}) \bmod D, \quad (6)$$

where $Y_{-1}=n_{RNTI}\neq 0$, A=39827, D=65537, k=$\lfloor n_S/2 \rfloor$, $n_S$ is the slot number within a radio frame, and the RNTI value $n_{RNTI}$ is a UE-specific identifier.

Figure 9:
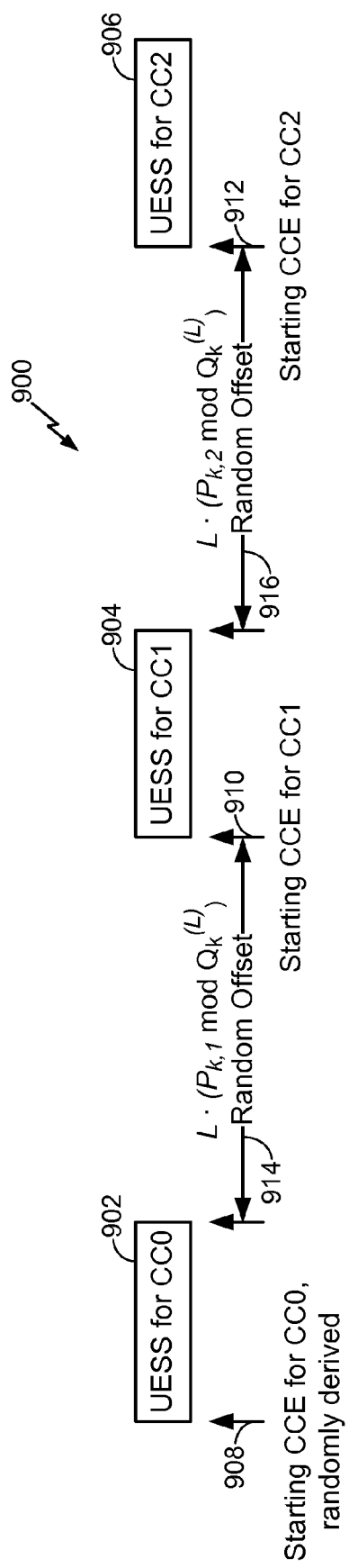
FIG. 9 illustrates an example arrangement of user-specific search spaces for multiple CCs in accordance with certain aspects of the present disclosure.

FIG. 9 illustrates an example arrangement 900 of user-specific search spaces 902, 904, 906 for searching of multiple CCs in accordance with certain aspects of the present disclosure. A starting CCE index 908 for a first CC may be randomly derived. On the other hand, a starting CCE index 910 for a second CC may be derived based on the CCE index 908 and a random offset 914 obtained according to equations (4)-(6) for n=1. Furthermore, a starting CCE index 912 for a third CC may be derived based on the previously computed CCE index 910 and a random offset 916 obtained according to equations (4)-(6) for n=2.

According to the proposed approach illustrated in FIG. 9, the search space for each CC may be calculated by the UE in an iterative manner, which may not allow deriving the search space for all CCs at the same time. An alternate non-recursive search space generation method is also proposed in the present disclosure.

In this case, if $N_{CC,k}$ represents the number of CCs configured in a subframe k, and n=0, 1, ..., $N_{CC,k}$-1 is the CC index within the configured CC, then the PDCCH decoding candidate $S_{k,m,n}^{(L)}$ for aggregation level L∈{1, 2, 4, 8}, subframe k, carrier index n and candidate index m may be given as, for n=0, 1, ..., $N_{CC,k}$-1

$$S_{k,m,n}^{(L)} = L \cdot \left\{ \left( Y_k + \sum_{c=0}^{n-1} M_c^{(L)} + (n-1) \cdot \frac{1}{Q_k^{(L)} + P_{k,n} \bmod Q_k^{(L)} + m} \right) \bmod \lfloor N_{CCE,k}/L \rfloor \right\} + i, \quad (7)$$

where $N_{CCE,k}$ is the total number of CCEs in the control region of the subframe k, L∈{1, 2, 4, 8} is the aggregation level, i=0, ..., L-1 is the CCE index within a given PDCCH decoding candidate, m=0, 1, ..., $M_n^{(L)}$-1 is the PDCCH decoding candidate index, and $M_n^{(L)}$ is the number of PDCCH candidates to be monitored by the UE in the $n^{th}$ CC's search space.

The parameter $Q_k^{(L)}$ from equation (7) may be a fixed number (e.g., $Q_k^{(L)}=3$), or $Q_k^{(L)}$ may be derived according to a specified algorithm, such as:

$$Q_k^{(L)} = \left\lfloor \frac{\left\lfloor \frac{N_{CCE,k}}{L} \right\rfloor - \sum_{n=0}^{N_{CC,k}-1} M_n^{(L)}}{N_{CC,k}-1} \right\rfloor \quad \text{for } N_{CC,k} > 1, \quad (8)$$

$$Q_k^{(L)} = 1 \quad \text{for } N_{CC,k} = 1.$$

The parameter $P_{k,n}$ from equation (7) may represent a suitable pseudorandom parameter, which may depend on the subframe index k within a radio frame, on the CC index n, and on the UE-specific identifier $n_{RNTI}$. For example, the $P_{k,n}$ may be defined as:

$$P_{k,n}=f(Y_{k+n}), \quad (9)$$

where f(.) may be any suitable function such as the identity function, and $Y_k$ may be given in a recursive manner as:

$$Y_k=(A \cdot Y_{k-1}) \bmod D, \quad (10)$$

where $Y_{-1}=n_{RNTI}\neq 0$, A=39827, D=65537, k=$\lfloor n_S/2 \rfloor$, $n_S$ is the slot number within a radio frame, and the RNTI value $n_{RNTI}$ is a UE-specific identifier. It should be noted that any other suitable formula may be also used to generate the pseudorandom values $P_{k,n}$.

Figure 10:
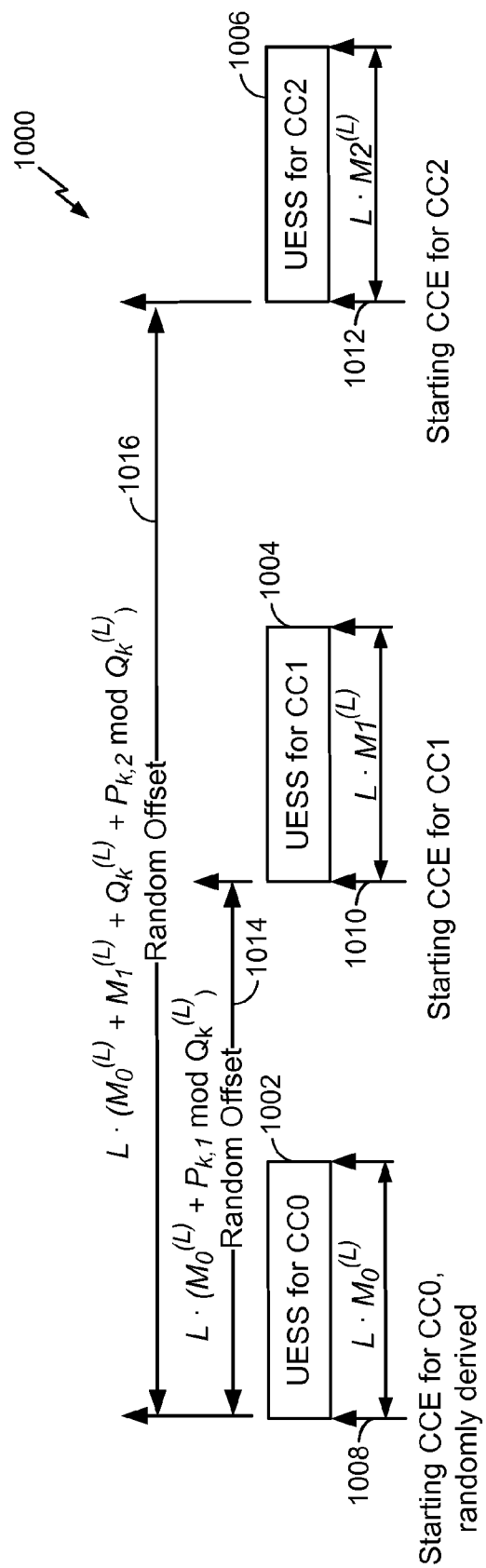
FIG. 10 illustrates another example arrangement of user-specific search spaces for multiple CCs in accordance with certain aspects of the present disclosure.

FIG. 10 illustrates an example arrangement 1000 of user-specific search spaces 1002, 1004, 1006 for searching of multiple CCs in accordance with certain aspects of the present disclosure, wherein the search spaces 1002, 1004, 1006 may be derived at the same time. A starting CCE index 1008 for a first CC may be randomly derived, while starting CCE indices 1010, 1012 for a second CC and a third CC may be independently derived based on the starting CCE index 1008 and random offsets 1014, 1016 computed according to equations (8)-(10) for n=1 and n=2, respectively. In an aspect of the present disclosure, the random offset 1016 may be always greater than the random offset 1014, as illustrated in FIG. 10.

It should be noted that the special case of expanded search space illustrated in FIG. 7 represents a sub-case of both the proposed search space arrangement 900 from FIG. 9 and the search space arrangement 1000 from FIG. 10 with the setting of $Q_k^{(L)}=1$.

Figure 11:
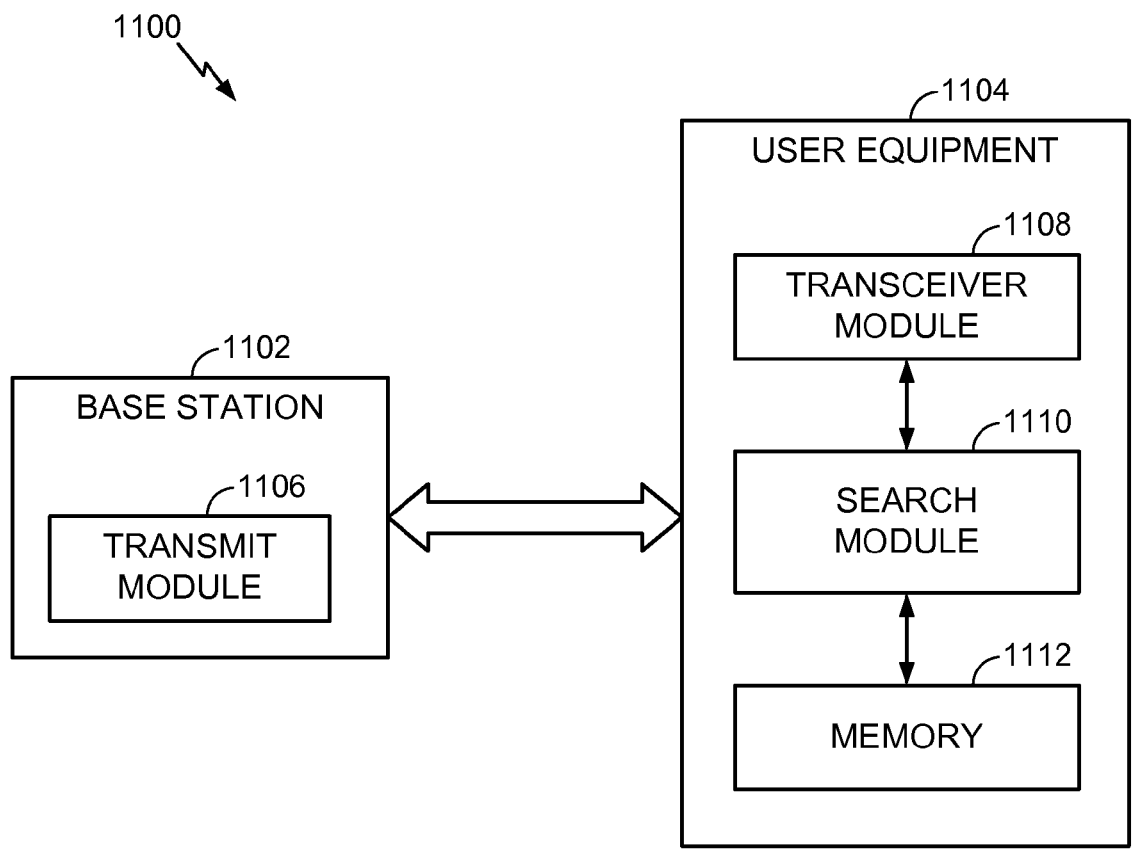
FIG. 11 illustrates an example system that facilitates searching for multiple CCs in accordance with certain aspects of the present disclosure.

FIG. 11 illustrates an example system 1100 that facilitates searching for multiple CCs in accordance with certain aspects of the present disclosure. The system 1100 may comprise an access point 1102 (e.g., base station, Node B, eNB, and so on) that may communicate with an access terminal 1104 (e.g., UE, mobile station, mobile device, and/or any number of disparate devices (not shown)). The base station 1102 may transmit information to the UE 1104 over a forward link channel or downlink channel; further the base station 1102 may receive information from the UE 1104 over a reverse link channel or uplink channel. Moreover, the system 1100 may be a MIMO system. Additionally, the system 1100 may operate in an OFDMA wireless network (such as 3GPP LTE, LTE-A, and so on). Also, in an aspect, the components and functionalities shown and described below in the base station 1102 may be present in the UE 1104 and vice versa.

The base station 1102 may comprise a transmit module 1106 that may transmit multiple PDCCHs over a wireless channel using a component carrier (CC). The PDCCHs may be utilized for scheduling PDSCH/PUSCH transmissions on two or more different CCs. The UE 1104 may comprise a transceiver module 1108 that may be configured to receive the PDCCHs transmitted from the base station 1102. The UE 1104 may further comprise a search module 1110 that may perform searching of the PDCCHs for an indication about the two or more CCs on which the PDSCH/PUSCH transmissions are scheduled. The searching may be performed in accordance with one of the aforementioned search space arrangements of the present disclosure. The UE 1104 may further comprise a memory 1112 for storing information about the two or more CCs determined by the search module 1110.

Figure 12:
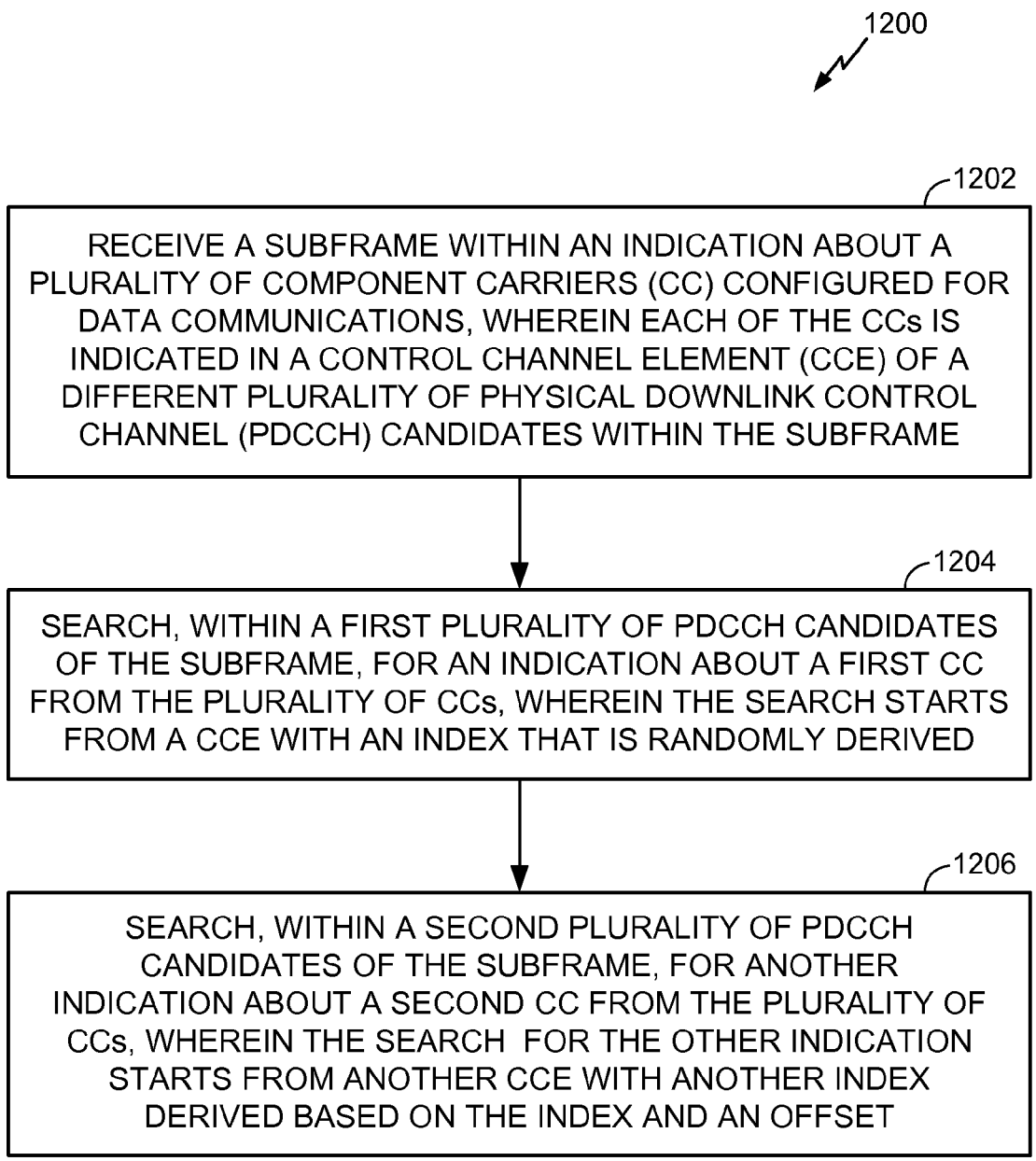
FIG. 12 illustrates example operations for searching multiple CCs configured within a received subframe in accordance with certain aspects of the present disclosure.

FIG. 12 illustrates example operations 1200 that may be performed at UE for searching multiple component carriers (CCs) in accordance with certain aspects of the present disclosure. At 1202, the UE may receive a subframe with an indication about a plurality of CCs configured for data communications, wherein each of the CCs may be indicated in a control channel element (CCE) of a different plurality of Physical Downlink Control Channel (PDCCH) candidates within the subframe. At 1204, the UE may search, within a first plurality of PDCCH candidates of the subframe, for an indication about a first CC from the plurality of CCs, wherein the search may start from a CCE with an index that is randomly derived. At 1206, the UE may search, within a second plurality of PDCCH candidates of the subframe, for another indication about a second CC from the plurality of CCs, wherein the search for the other indication may start from another CCE with another index derived based on the index and an offset.

In an aspect, the UE may further search, within a third plurality of PDCCH candidates of the subframe, for a third indication about a third CC from the plurality of CCs. The search for the third indication may start from a CCE with a third index derived based on the index and another offset greater than the offset.

In one aspect of the present disclosure, the data communications may comprise transmitting data from the UE on two or more CCs of the plurality of configured CCs (e.g., PUSCH transmissions). In another aspect, the data communications may comprise receiving data at the UE on two or more CCs of the plurality of configured CCs (e.g., PDSCH transmissions).

Figure 13:
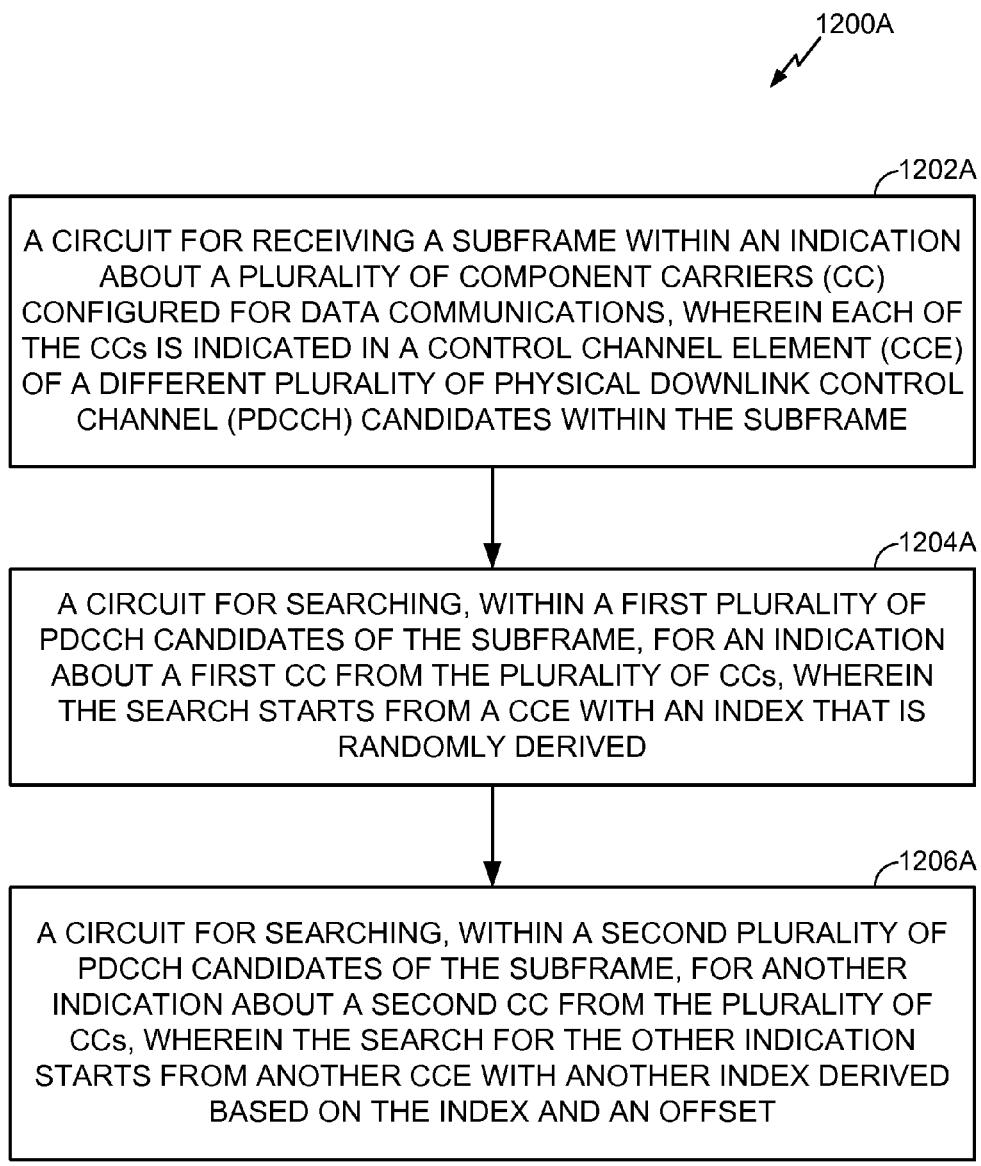
FIG. 13 illustrates example components capable of performing the operations illustrated in FIG. 12.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 1200 illustrated in FIG. 12 correspond to components 1200A illustrated in FIG. 13.

Figure 14A:
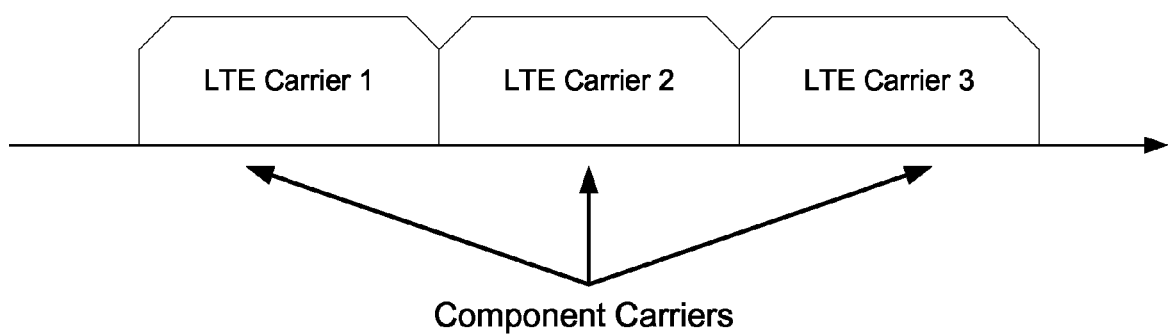
FIG. 14A discloses a continuous carrier aggregation type.
Figure 14B:
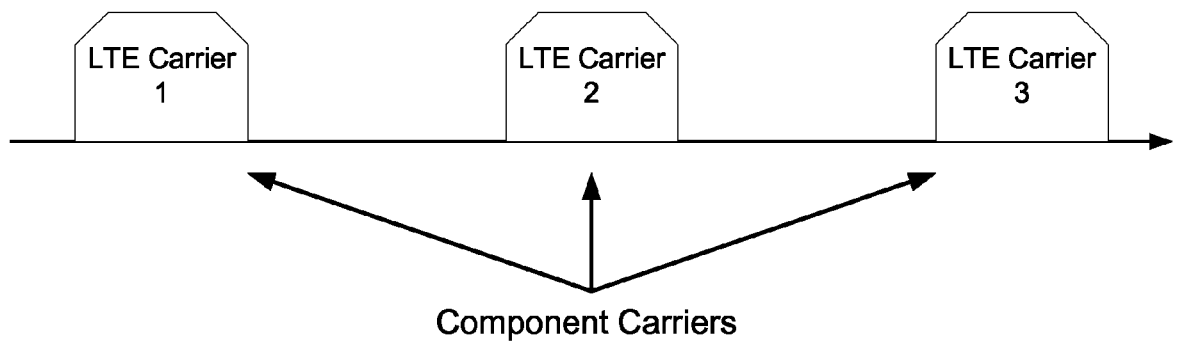
FIG. 14B discloses a non-continuous carrier aggregation type.

For the LTE-Advanced mobile systems, two types of carrier aggregation (CA) methods have been proposed, continuous CA and non-continuous CA. They are illustrated in FIGS. 14A and 14B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for receiving may comprise a receiver, e.g., the receiver 254 from FIG. 2 of the access terminal 250, the receiver 312 from FIG. 3 of the wireless device 302, or the transceiver module 1108 from FIG. 11 of the user equipment 1104. The means for transmitting may comprise a transmitter, e.g., the transmitter 254 from FIG. 2 of the access terminal 250, the transmitter 310 from FIG. 3 of the wireless device 302, or the transceiver module 1108. The means for searching may comprise an application specific integrate circuit, e.g., the processor 270 from FIG. 2 of the access terminal 250, the processor 304 from FIG. 3 of the wireless device 302, or the search module 1110 from FIG. 11 of the user equipment 1104.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
receiving a subframe scheduling a plurality of component carriers (CCs) configured for data communications, wherein Physical Downlink Control Channel (PDCCH) information for each of the CCs is in a different plurality of PDCCH candidates within the subframe;
searching, within a first plurality of PDCCH candidates of the subframe on a first CC from the plurality of CCs, for a first indication about the first CC, wherein the search starts from a control channel element (CCE) with a first index that is based at least on one randomly derived parameter;
searching, within a second plurality of PDCCH candidates of the subframe on the first CC, for a second indication about a second CC from the plurality of CCs, wherein the search for the second indication starts from a second CCE with a second index derived based on the first index and an offset, wherein the offset is computed based on a number of PDCCH candidates in the second plurality of PDCCH candidates and a CC index of the second CC.

2. The method of claim 1, wherein the data communications comprises:
transmitting data on the first and second CCs of the plurality of configured CCs.

3. The method of claim 1, wherein the data communications comprises:
receiving data on the first and second CCs of the plurality of configured CCs.

4. The method of claim 1, wherein a number of CCEs to be searched within each PDCCH candidate of the plurality of PDCCH candidates is based on a system aggregation level.

5. The method of claim 1, wherein the search for the second indication is performed after performing the search for the first indication.

6. The method of claim 1, wherein the search for the first indication and the search for the second indication are performed at the same time.

7. The method of claim 1, wherein the computation of the offset is further based on at least one of:
a system aggregation level, a number of CCEs in the subframe, a user identification, or an index of the subframe.

8. The method of claim 1, wherein the offset represents a difference between the first index and the second index.

9. The method of claim 1, further comprising:
searching, within a third plurality of PDCCH candidates of the subframe, for a third indication about a third CC from the plurality of CCs, wherein the search for the third indication starts from a CCE with a third index derived based on the first index and another offset greater than the offset.

10. An apparatus for wireless communications, comprising:
a receiver configured to receive a subframe scheduling a plurality of component carriers (CCs) configured for data communications, wherein Physical Downlink Control Channel (PDCCH) information for each of the CCs is in a different plurality of PDCCH candidates of a single CC within the subframe;
a first circuit configured to search, within a first plurality of PDCCH candidates of the subframe, for a first indication about a first CC from the plurality of CCs, wherein the search starts from a control channel element (CCE) with a first index that is based at least on one randomly derived parameter;
a second circuit configured to search, within a second plurality of PDCCH candidates of the subframe, for a second indication about a second CC from the plurality of CCs, wherein the search for the second indication starts from a second CCE with a second index derived based on the first index and an offset, wherein the offset is computed based on a number of PDCCH candidates in the second plurality of PDCCH candidates and a CC index of the second CC.

11. The apparatus of claim 10, further comprising:
a transmitter configured to transmit data on the first and second CCs of the plurality of configured CCs.

12. The apparatus of claim 10, wherein the receiver is also configured to receive data on the first and second CCs of the plurality of configured CCs.

13. The apparatus of claim 10, wherein a number of CCEs to be searched within each PDCCH candidate of the plurality of PDCCH candidates is based on a system aggregation level.

14. The apparatus of claim 10, wherein the search for the second indication is performed after performing the search for the first indication.

15. The apparatus of claim 10, wherein the search for the first indication and the search for the second indication are performed at the same time.

16. The apparatus of claim 10, wherein the computation of the offset is further based on at least one of:
a system aggregation level, a number of CCEs in the subframe, a user identification, or an index of the subframe.

17. The apparatus of claim 10, wherein the offset represents a difference between the first index and the second index.

18. The apparatus of claim 10, further comprising:
a third circuit configured to search, within a third plurality of PDCCH candidates of the subframe, for a third indication about a third CC from the plurality of CCs, wherein the search for the third indication starts from a CCE with a third index derived based on the first index and another offset greater than the offset.

19. An apparatus for wireless communications, comprising:
means for receiving a subframe scheduling a plurality of component carriers (CCs) configured for data communications, wherein Physical Downlink Control Channel (PDCCH) information for each of the CCs is in a different plurality of PDCCH candidates within the subframe;
means for searching, within a first plurality of PDCCH candidates of the subframe on a first CC from the plurality of CCs, for a first indication about the first CC, wherein the search starts from a control channel element (CCE) with a first index that is based at least on one randomly derived parameter;
means for searching, within a second plurality of PDCCH candidates of the subframe on the first CC, for a second indication about a second CC from the plurality of CCs, wherein the search for the second indication starts from a second CCE with a second index derived based on the first index and an offset, wherein the offset is computed based on a number of PDCCH candidates in the second plurality of PDCCH candidates and a CC index of the second CC.

20. The apparatus of claim 19, further comprising:
means for transmitting data on the first and second CCs of the plurality of configured CCs.

21. The apparatus of claim 19, wherein the means for receiving is further configured to receive data on the first and second CCs of the plurality of configured CCs.

22. The apparatus of claim 19, wherein a number of CCEs to be searched within each PDCCH candidate of the plurality of PDCCH candidates is based on a system aggregation level.

23. The apparatus of claim 19, wherein the search for the second indication is performed after performing the search for the first indication.

24. The apparatus of claim 19, wherein the search for the first indication and the search for the second indication are performed at the same time.

25. The apparatus of claim 19, wherein the computation of the offset is further based on at least one of:
a system aggregation level, a number of CCEs in the subframe, a user identification, or an index of the subframe.

26. The apparatus of claim 19, wherein the offset represents a difference between the first index and the second index.

27. The apparatus of claim 19, further comprising:
means for searching, within a third plurality of PDCCH candidates of the subframe, for a third indication about a third CC from the plurality of CCs, wherein the search for the third indication starts from a CCE with a third index derived based on the first index and another offset greater than the offset.

28. A computer-program product for wireless communications, comprising a non-transitory computer-readable medium comprising instructions executable to:
receive a subframe scheduling a plurality of component carriers (CCs) configured for data communications, wherein Physical Downlink Control Channel (PDCCH) information for each of the CCs is in a different plurality of PDCCH candidates within the subframe;
search, within a first plurality of PDCCH candidates of the subframe on a first CC from the plurality of CCs, for a first indication about the first CC, wherein the search starts from a control channel element (CCE) with a first index that is based at least on one randomly derived parameter;
search within a second plurality of PDCCH candidates of the subframe on the first CC, for a second indication about a second CC from the plurality of CCs, wherein the search for the second indication starts from a second CCE with a second index derived based on the first index and an offset, wherein the offset is computed based on a number of PDCCH candidates in the second plurality of PDCCH candidates and a CC index of the second CC.

29. The computer-program product of claim 28, wherein the instructions further comprise:
instructions for transmitting data on the first and second CCs of the plurality of configured CCs.

30. The computer-program product of claim 28, wherein the instructions further comprise:
instructions for receiving data on the first and second CCs of the plurality of configured CCs.

31. The computer-program product of claim 28, wherein a number of CCEs to be searched within each PDCCH candidate of the plurality of PDCCH candidates is based on a system aggregation level.

32. The computer-program product of claim 28, wherein the search for the second indication is performed after performing the search for the first indication.

33. The computer-program product of claim 28, wherein the search for the first indication and the search for the second indication are performed at the same time.

34. The computer-program product of claim 28, wherein the computation of the offset is further based on at least one of:
    a system aggregation level, a number of CCEs in the subframe, a user identification, or an index of the subframe.

35. The computer-program product of claim 28, wherein the offset represents a difference between the first index and the second index.

36. The computer-program product of claim 28, wherein the instructions further comprise:
    instructions for searching, within a third plurality of PDCCH candidates of the subframe, for a third indication about a third CC from the plurality of CCs, wherein the search for the third indication starts from a CCE with a third index derived based on the first index and another offset greater than the offset.

37. A wireless node, comprising:
    at least one antenna;
    a receiver configured to receive via the at least one antenna a subframe scheduling a plurality of component carriers (CCs) configured for data communications, wherein Physical Downlink Control Channel (PDCCH) information for each of the CCs is in a different plurality of PDCCH candidates within the subframe;
    a first circuit configured to search, within a first plurality of PDCCH candidates of the subframe on a first CC from the plurality of CCs, for a first indication about the first CC, wherein the search starts from a control channel element (CCE) with a first an index that is based at least on one randomly derived parameter;
    a second circuit configured to search, within a second plurality of PDCCH candidates of the subframe on the first CC, for a second indication about a second CC from the plurality of CCs, wherein the search for the second indication starts from a second CCE with a second index derived based on the first index and an offset, wherein the offset is computed based on a number of PDCCH candidates in the second plurality of PDCCH candidates and a CC index of the second CC.

* * * * *